United States Patent
Zhang et al.

(10) Patent No.: US 11,010,353 B2
(45) Date of Patent: May 18, 2021

(54) METHOD AND DEVICE FOR FILE SYSTEM LOG

(71) Applicant: EMC IP Holding Company LLC, Hopkinton, MA (US)

(72) Inventors: Lester Ming Zhang, Beijing (CN); Chen Gong, Beijing (CN); Henry Hao Fang, Beijing (CN); Leon Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 259 days.

(21) Appl. No.: 15/993,791

(22) Filed: May 31, 2018

(65) Prior Publication Data

US 2018/0349410 A1 Dec. 6, 2018

(30) Foreign Application Priority Data

Jun. 2, 2017 (CN) .......................... 201710409031.6

(51) Int. Cl.
*G06F 16/18* (2019.01)
*G06F 16/23* (2019.01)
*G06F 16/17* (2019.01)

(52) U.S. Cl.
CPC ...... *G06F 16/1865* (2019.01); *G06F 16/1734* (2019.01); *G06F 16/2379* (2019.01)

(58) Field of Classification Search
None
See application file for complete search history.

(56) References Cited

U.S. PATENT DOCUMENTS

| 6,021,408 | A  | * | 2/2000 | Ledain ................... G06F 16/10 707/823 |
| 7,653,836 | B1 | * | 1/2010 | Chatterjee ........... G06F 11/1076 714/15 |
| 9,037,596 | B2 |   | 5/2015 | Hsu |
| 9,158,540 | B1 |   | 10/2015 | Tzelnic et al. |
| 9,235,479 | B1 |   | 1/2016 | Muntz et al. |
| 9,286,261 | B1 |   | 3/2016 | Tzelnic et al. |
| 9,323,765 | B1 |   | 4/2016 | Stefanov et al. |
| 9,594,513 | B1 |   | 3/2017 | Delgado et al. |
| 9,612,754 | B1 |   | 4/2017 | Delgado et al. |
| 2012/0096055 | A1 | * | 4/2012 | Lee ..................... G06F 16/2358 707/822 |
| 2016/0070644 | A1 | * | 3/2016 | D'Sa ..................... G06F 3/0611 711/5 |
| 2016/0344834 | A1 | * | 11/2016 | Das ..................... G06F 11/3476 |
| 2018/0307425 | A1 | * | 10/2018 | Blount ................... G06F 3/061 |

* cited by examiner

*Primary Examiner* — Tony Mahmoudi
*Assistant Examiner* — Umar Mian
(74) *Attorney, Agent, or Firm* — BainwoodHuang

(57) ABSTRACT

Embodiments of the present disclosure provide a method and device for a file system log. In some embodiments, there is provided a computer-implemented method. The method comprises: in response to receiving a write request for metadata associated with a first transaction, determining at least one zone associated with the first transaction from a plurality of zones of the metadata, the plurality of zones being formed by striping the metadata; requesting a resource slice for the at least one zone from a resource pool of a logging system; and recording to the resource slice a log that the first transaction modifies the at least one zone.

15 Claims, 8 Drawing Sheets

METHOD AND DEVICE FOR FILE SYSTEM LOG

RELATED APPLICATIONS

This application claim priority from Chinese Patent Application Number CN201710409031.6, filed on Jun. 2, 2017 at the State Intellectual Property Office, China, titled "METHOD AND DEVICE FOR FILE SYSTEM LOG" the contents of which is herein incorporated by reference in its entirety.

FIELD

Embodiments of the present disclosure generally relate to the data storage, and more specifically, to method, device and computer program product for file system log.

BACKGROUND

In a logging protected file system, it usually includes a serial log recording sub-system. Each IO generates one or more logging transactions and writes them to the logging system before the metadata is flushed. Transaction write are serialized in this case and such logging system becomes a bottleneck for current file system in a multi-core platform.

SUMMARY

Embodiments of the present disclosure aim to provide method, device and computer program product for file system log.

In a first aspect of the present disclosure, there is provided a computer-implemented method. The method comprises: in response to receiving a write request for metadata associated with a first transaction, determining at least one zone associated with the first transaction from a plurality of zones of the metadata, the plurality of zones being formed by striping the metadata; requesting a resource slice for the at least one zone from a resource pool of a logging system; and recording to the resource slice a log that the first transaction modifies the at least one zone.

In a second aspect of the present disclosure, there is provided an electronic device. The device comprises: at least one processor; and a memory coupled to the at least one processor and having instructions stored thereon, the instructions, when executed by the at least one processor, causing the device to perform acts comprising: in response to receiving a write request for metadata associated with a first transaction, determining at least one zone associated with the first transaction from a plurality of zones of the metadata, the plurality of zones being formed by striping the metadata; requesting a resource slice for the at least one zone from a resource pool of a logging system; and recording to the resource slice a log that the first transaction modifies the at least one zone.

In a third aspect of the present disclosure, there is provided a computer program product having instructions stored thereon, the instructions, when executed by at least one processing unit, causing the at least one processing unit to perform a method comprising in response to receiving a write request for metadata associated with a first transaction, determining at least one zone associated with the first transaction from a plurality of zones of the metadata, the plurality of zones being formed by striping the metadata; requesting a resource slice for the at least one zone from a resource pool of a logging system; and recording to the resource slice a log that the first transaction modifies the at least one zone.

The Summary is to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the drawings, the above and other objectives, features, and advantages of embodiments of the present disclosure will become more apparent. Several example embodiments of the present disclosure will be illustrated by way of example but not limitation in the drawings, in which.

In each drawing, same or corresponding signs refer to same or corresponding parts.

DETAILED DESCRIPTION OF EMBODIMENTS

Various example embodiments of the present disclosure will be described in details with reference to the drawings in the following text. It should be noted that the drawings and the description only involve example embodiments. It should be pointed out that alternative embodiments of the structure and the method disclosed herein can be easily contemplated according to the subsequent descriptions and these alternative embodiments can be utilized without deviating from the principles protected by the present disclosure.

It should be appreciated that those example embodiments are provided merely to enable those skilled in the art to better understand and further implement the present disclosure and are not intended for limiting the scope disclosed herein in any manner.

As used herein, the terms "includes," "comprise" and their variants are to be read as open-ended terms that mean "includes, but is not limited to." The term "based on" is to be read as "based at least in part on." The term "one embodiment" is to be read as "at least one embodiment." The term "one further embodiment" is to be read as "at least one further embodiment." Related definitions of other terms will be present in the following description.

It should be understood that a logging file system is added with log records of modifications of a file system based on a traditional file system, to track changes of the file system and record contents of the changes into the log. The logging file system keeps log records in the disk partition. Write operation first operates on a record file; if the entire write operation is interrupted due to a certain reason (such as system power-down), the write operation prior to the interruption will be recovered based on the log records when the system reboots. In the logging file system, all changes of the file system will be recorded into the log and the file system will write the updated metadata and the file contents into the disk at every interval. Before making any modifications to the metadata, the file system drive program will write an entry into the log, which entry describes what it will do and then modifies the metadata.

In a logging protected file system, it usually includes a serial log recording sub-system. Each 10 generates one or more logging transactions and writes them to the logging system before the metadata is flushed into a solid-state storage apparatus. Transaction write are serialized in this case and such logging system becomes a bottleneck for current file system in a multi-core platform.

Therefore, it is required to implement an effective logging solution of a multi-core file system, so as to concurrently record the file system log. This can greatly improve IO efficiency and reduce response time. Besides, this solution can also provide a larger log volume for non-associated transactions.

Figure 1:
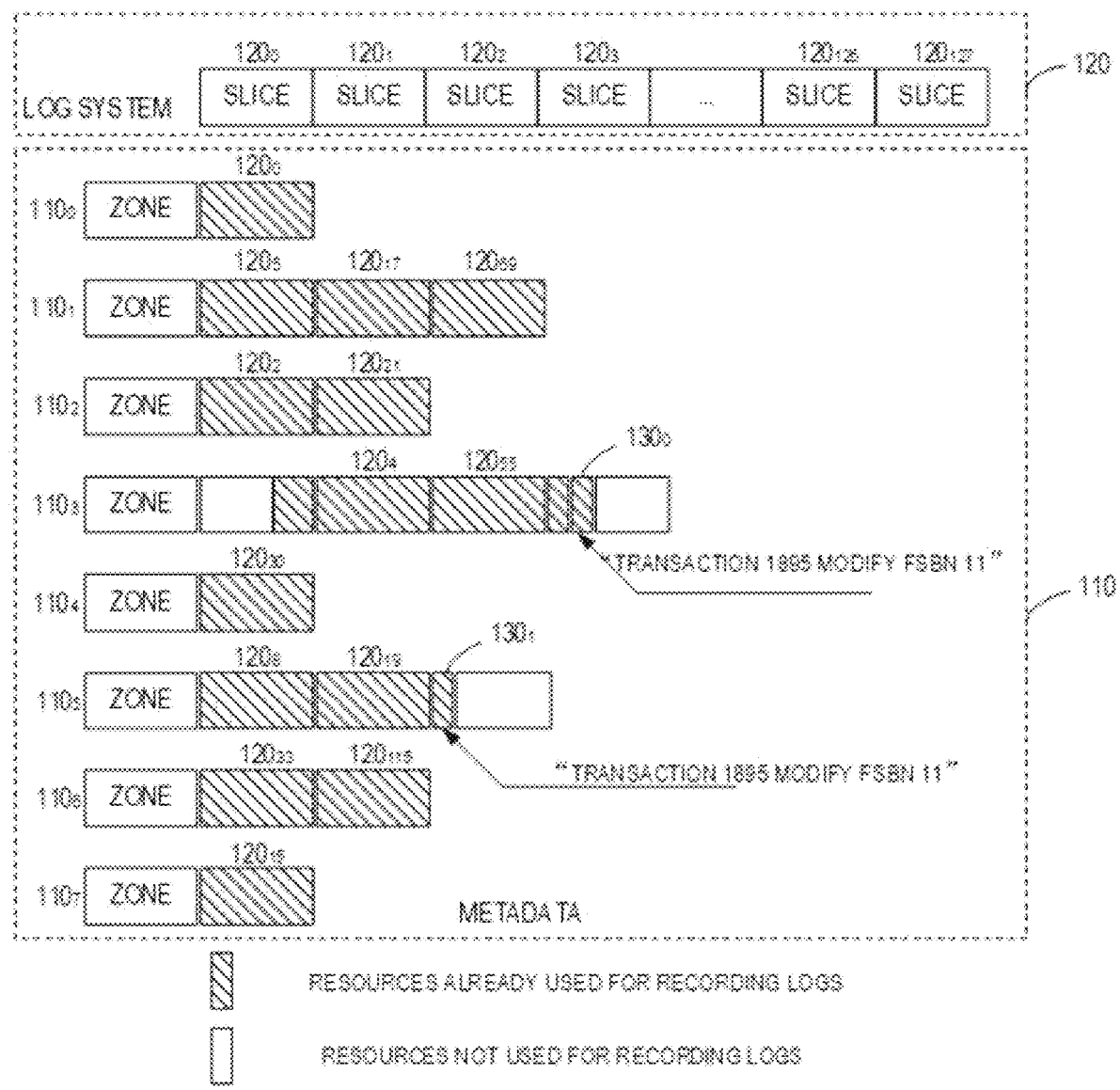
FIG. 1 illustrates a schematic diagram of log write according to embodiments of the present disclosure.
Figure 2:
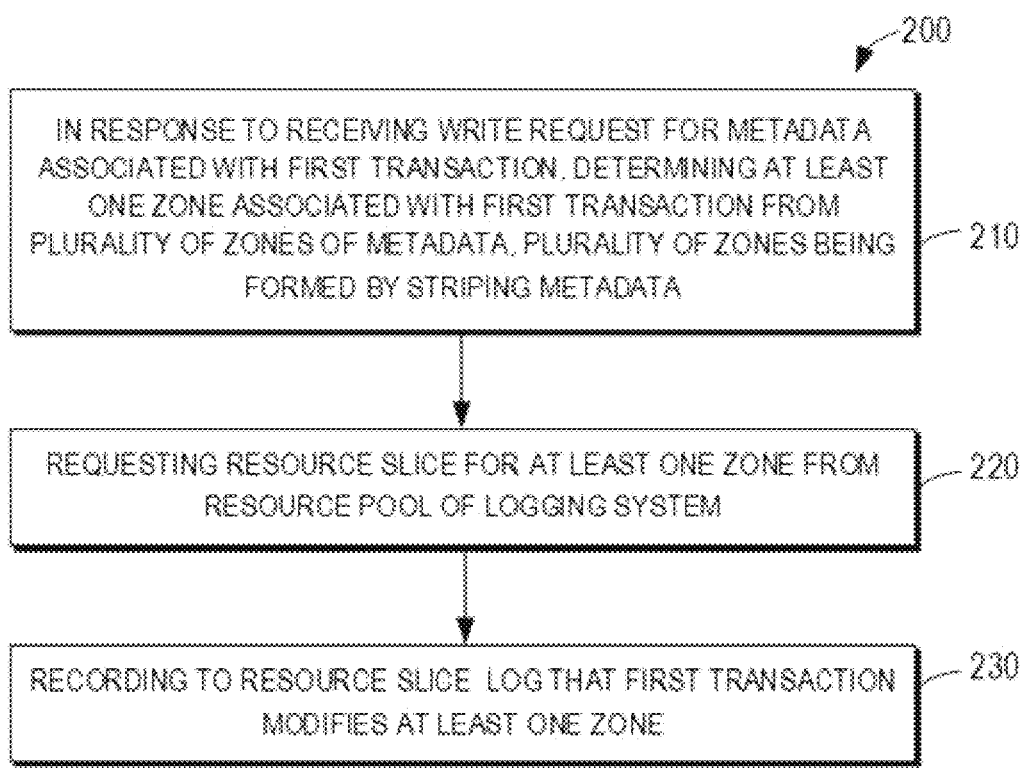
FIG. 2 illustrates a flowchart of a log recording method 200 of a multi-core file system according to embodiments of the present disclosure.

FIG. 1 illustrates a schematic diagram of log write according to embodiments of the present disclosure and FIG. 2 illustrates a flow chart of a logging method 200 of a multi-core file system according to embodiments of the present disclosure. The logging solution of the multi-core file system according to embodiments of the present disclosure shown in FIG. 2 will be described in details with reference to FIG. 1.

In some embodiments of the present invention, metadata can be striped into a plurality of zones according to File System Block Number (FSBN) for example. It should be appreciated that the file system here is only an example of the metadata. Without deviating from the inventive concept of the present invention, metadata partition can also be implemented based on other factors. As shown in FIG. 1, the metadata 110 can be partitioned into for example 8 zones $110_0$ to $110_7$. After partitioning the metadata 110 into a plurality of zones $110_0$ to $110_7$, each of the zones $110_0$ to $110_7$ can have respective logging resource slice. It should be understood that the logging resource slice possessed by each zone can be resources requested from the logging system in need of recording the log, and can also be allocated to the metadata upon partitioning the metadata. As shown in FIG. 1, if the logging system 120 has a resource space of 128M for example, the resource space can be partitioned into 128 slices $120_0$ to $120_{177}$ and each of the slices $120_0$ to $120_{177}$ has 1M resource space.

When partition of the metadata is determined, a log that the transaction modifies at least one zone is recorded into a zone request associated with the FSBN or an allocated resource slice for different transactions that intend to modify different FSBNs. In this way, log write can be concurrently performed and write performance of the log can be significantly promoted.

With reference to FIG. 2, when a write request of metadata associated with a first transaction is received at 210, at least one zone associated with the first transaction can be determined from a plurality of zones of the metadata. The plurality of zones of the metadata is a plurality of zones obtained by striping the metadata according to FSBN as mentioned above. According to FIG. 1, a sequence number of the first transaction can be 1895 for example and the FSBN 11 that the transaction 1895 intends to modify is associated with the zone $110_3$ for example.

At 220, a resource slice is requested for at least one zone from a resource pool of the logging system. It should be understood that FIG. 2 does not demonstrate the initial state of the logging record of the file system, and the plurality of zones $110_0$ to $110_7$ has already recorded with logs regarding metadata modifications made by previous transactions. Therefore, the plurality of zones $110_0$ to $110_7$ has already been allocated with logging resource slices of unequal size. It should be appreciated that the sequence number of the logging resource slices allocated for the plurality of zones $110_0$ to $110_7$ is not continuous because the zones to be modified by the transaction are random.

When a transaction 1895 is received and a zone $110_3$ to be modified by the transaction is determined, it can, for example, request for the zone $110_3$ a resource slice of recording a log that the transaction 1895 modifies the zone $110_3$. In the example shown by FIG. 1, the zone $110_3$ contains space on the resource slice that has been requested, but not yet used for recording logs. In FIG. 1, the resources that have been used for recording logs are represented by boxes filled with slash and the resources that are not used for recording logs are denoted by blank boxes.

Next, a log that the first transaction modifies at least one zone is recorded to the resource slice. For example, it can record a log that "transaction 1895 modifies FSBN 11" to a free resource block $130_0$ on the resource slice.

As shown in FIG. 1, the file system also receives a transaction 1981 that is going to modify FSBN 13 and the process is identical to the above described one. When the FSBN 13 that the transaction 1981 intends to modify is determined to be associated with the zone $110_5$ and a request of a log for recording the modification of the zone by the transaction 1981 is made for the zone $110_5$, it can record the log that "the transaction 1981 modifies the FSBN 13" to a free resource block $130_1$ on the resource slice for example.

It should be understood that each transaction received by the file system has a continuously increasing sequence number. The transaction will enter a logging resource slice of a specific zone based on metadata zone (FSBN that the transaction intends to modify).

In some embodiments, transactions can for example relate to transactions cross the zones, which means that each transaction may need to modify a plurality of FSBNs on more than one zone. Accordingly, the current transaction needs to wait for previous transactions of the related zones, the previous transactions having smaller sequence number than the current transaction.

Figure 3:
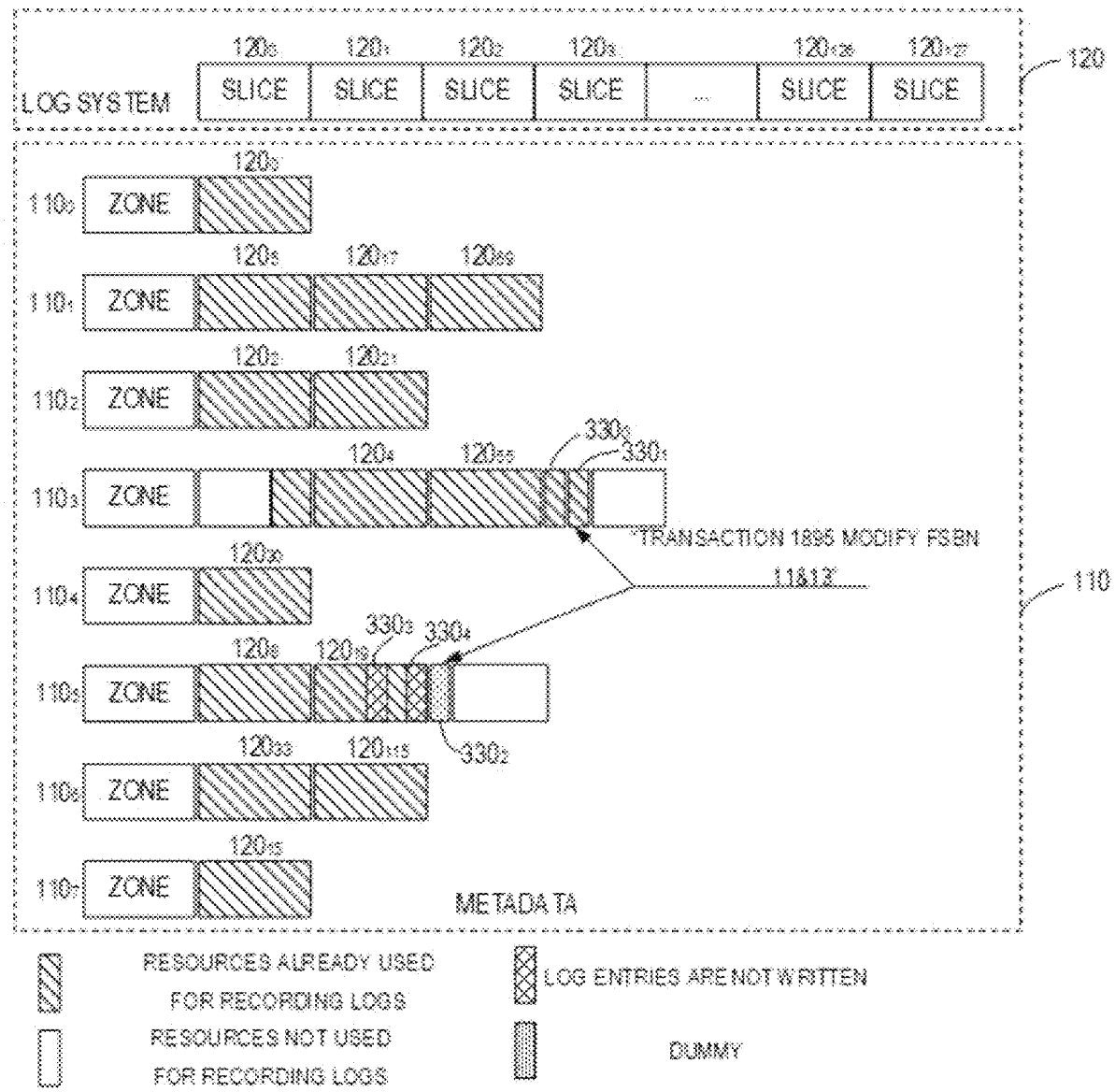
FIG. 3 illustrates a schematic diagram of log write according to embodiments of the present disclosure.

FIG. 3 illustrates a schematic diagram of log write according to embodiments of the present disclosure. According to FIG. 3, in some embodiments, the transaction 1895 can for example modify the zone $110_3$ and the zone $110_5$ that are respectively associated with FSBN 11 and FSBN 13. Therefore, the log that the transaction 1895 modifies the zone $110_3$ and the log that the transaction 1895 modifies the zone $110_5$ should be recorded to zone $110_3$ and zone $110_5$ respectively. Because each write log has a limited size, there may exist the situation that the logs of the previous transactions in the zone have not been written into the zone yet. That is, the resource slice, to which the log that the current transaction modifies a corresponding zone will be recorded, includes a buffer queue of logs to be recorded.

Information associated with the logs to be recorded can be acquired by querying Largest Non-Written Sequence Number (LNWSN) and Largest Written Sequence Number (LWSN) on the resource slice of each zone. As shown in FIG. 3, LNWSN on the logging resource slice is zero in the zone $110_3$, which means there are no logs to be recorded, and LWSN on the logging resource slice is 1893, which means that the logging resource block $330_0$ records a log that the transaction 1893 modifies the zone $110_3$. However, in the zone $110_5$, LNWSN on the logging resource slice is 1892 while LWSN is 1887, which means that the logging resource block $330_3$ records the log that the transaction 1887 modifies the zone $110_5$ and the logging resource block $330_4$ that represents the log that the transaction 1887 modifies the zone $110_5$ has not been written into the resource slice of the zone $110_5$ yet. Accordingly, it indicates that the log write of the transaction 1895 on the zone $110_3$ does not need to wait whereas its log write on the zone $110_5$ needs to wait. In FIG. 3, resources with recorded logs are schematically represented by boxes filled with slash and log entries that are not written are denoted by boxes filled with diamonds.

When it is determined that the resource slice associated with the zone $110_3$ does not contain a buffer queue of logs to be recorded and the resource slice associated with the zone $110_5$ includes a buffer queue of logs to be recorded, both the log that the transaction 1895 modifies the zone $110_3$ and the log that the transaction 1895 modifies the zone $110_5$ are recorded to the resource slice associated with the zone $110_3$, such as the resource block 3301 in FIG. 3.

In some embodiments, it can generate dummy for the log that the transaction 1895 modifies the zone $110_5$. The term "dummy" used herein only exists on the memory and indicates a mirror of the transaction 1985. Compared with the resource blocks recorded with logs, dummy only records modifications of related zones by the transaction without disclosing the specific contents of the modifications made to the metadata. In FIG. 3, dummy is schematically represented by boxes filled with dots. After generating a dummy, the dummy $330_2$ is added into a buffer queue of logs to be recorded of the resource slice associated with the zone $110_5$. The dummy specifies the modifications to the zone $110_5$ by the transaction 1895.

Figure 4:
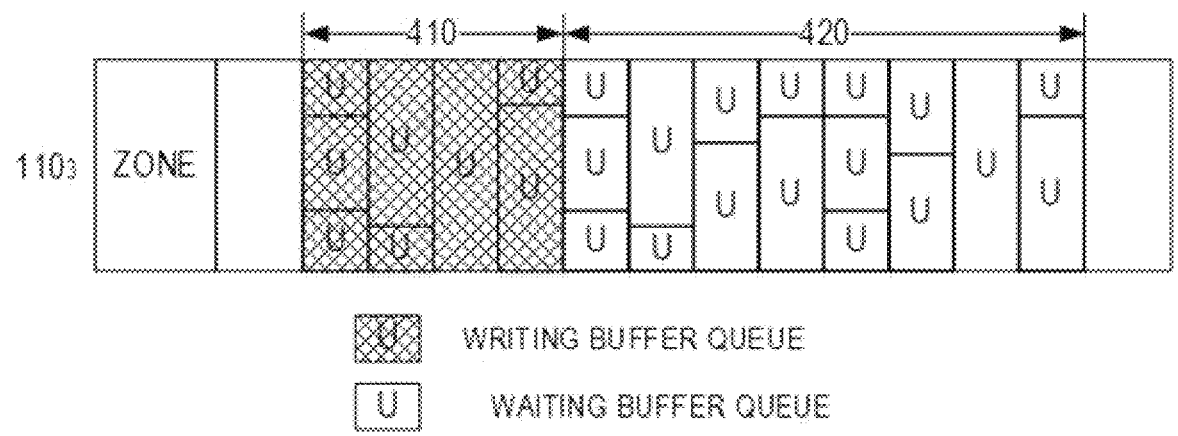
FIG. 4 illustrates a schematic diagram of log write according to embodiments of the present disclosure.

As mentioned above, to improve write performance, every log written into the resource slice in the file system can have a predefined size, for example, the size can be 8K. FIG. 4 illustrates a schematic diagram of log write according to embodiments of the present disclosure. As shown in FIG. 4, the resource slice for recording logs in the zone $110_3$ can have N*8K write queues 410 and buffer queues 420. If the logs that are currently being recorded have a size less than 8K or the total size of the logs in the buffer queue 420 does not reach 8K, these logs are temporarily remained in the buffer queue 420. Once the total size of the logs to be recorded in the buffer queue 420 is determined to reach 8K, the logs to be recorded in the buffer queue 420 are recorded to the resource slice as a write queue 410. In FIG. 4, U denotes a transaction object in the memory.

The bulk write described by FIG. 4 may encounter the interlocking situation when the transactions simultaneously modify one zone. It has been explained in FIG. 3 that the transaction 1895 simultaneously modifies the zone $110_3$ and the zone $110_5$. As the resource slice of the zone $110_5$ includes a buffer queue of logs to be recorded, the logs that the transaction 1895 modifies the zone $110_3$ and the zone $110_5$ are recorded to the resource block of the zone $110_3$ while the dummy of the log that indicates the transaction 1895 modifies the zone $110_5$ is added into the buffer queue in the resource slice of the zone $110_5$. Based on embodiment of FIG. 3, FIG. 5 illustrates the case of receiving a subsequent transaction, i.e., transaction 1981, for modifying the zone $110_3$ and the zone $110_5$.

Figure 5:
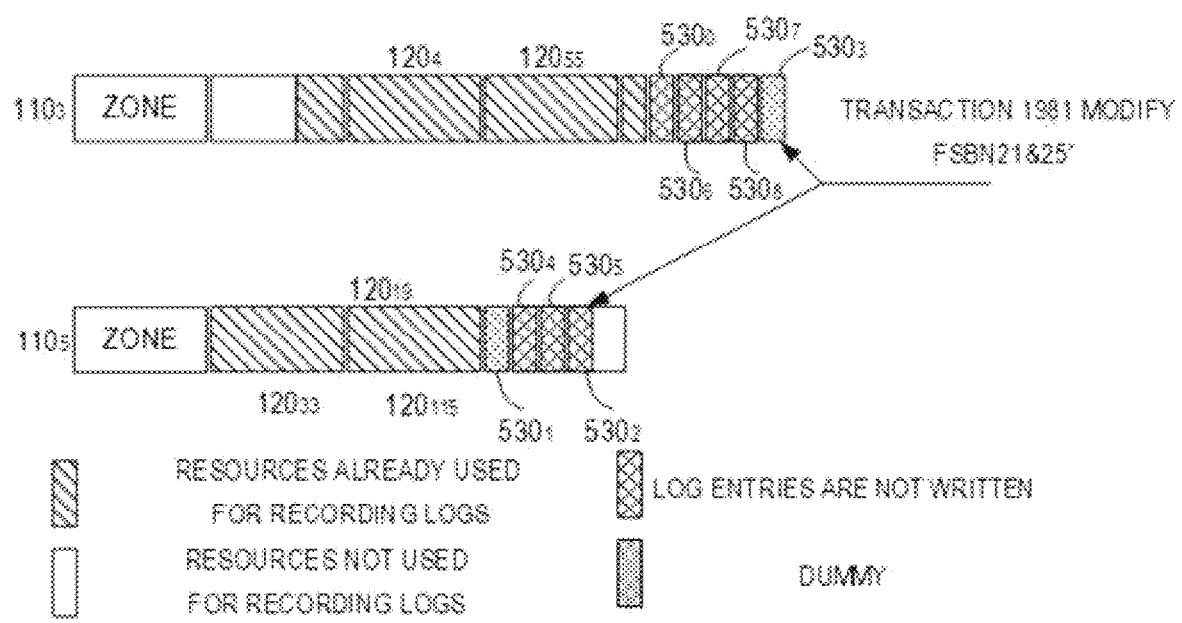
FIG. 5 illustrates a schematic diagram of log write according to embodiments of the present disclosure.

FIG. 5 illustrates a schematic diagram of log write according to embodiments of the present disclosure. As shown, the resource block $530_3$ is a resource block recording the logs that the previous transaction modifies the zone $110_3$ and the zone $110_5$, and the resource block $530_3$ denotes the dummy that specifies the log that the previous transaction modifies the zone $110_5$. With reference to embodiment shown in FIG. 4, the size of the resource block $530_0$ in the resource slice of the zone $110_3$ fails to reach a threshold size of one log write, so the resource block $530_0$ needs to wait for the logs of the subsequent transaction to be recorded for a joint write, and the buffer queue waiting for the logs of the subsequent transaction to be recorded includes transaction 1981 and dummy $530_3$. The buffer queue of the resource slice in the zone $110_5$ includes the dummy $530_1$ of the log that indicates modification to the zone $110_5$ by the transaction 1895, and the resource block $530_2$ of the log that the transaction 1981 modifies the zone $110_3$ and the zone $110_5$. As explained in the previous text, write of the log about transactions should be performed according to the sequence of the transaction, which causes the resource blocks in the buffer queue of the resource slice of the zone $110_3$ and the zone $110_5$ unable to write into the resource slice.

In some embodiments, it can divide logging resource blocks in the buffer queue and directly write the part without dummy into the resource slice. For example, in the zone $110_3$, the resource blocks $530_0$, $530_6$, $530_7$ and $530_8$ are recorded in the resource slice associated with the zone, even if the size of the resource blocks does not reach 8K. Similarly, in the zone $110_5$, it also can divide dummy and logging resource blocks in the buffer queue to write into the corresponding resource block.

The modifications to the metadata zone by the transactions can be recorded concurrently according to the sequence of the transactions through the method for recording logs associated with transactions described with reference to FIGS. 1 to 5. Once the file system is interrupted due to failure or power-down, it can reproduce modifications to the file system by the transactions based on the record of the logging system after power on, so as to recover the system in an integrated and reliable way. The file system will first read logs about the transactions on the resource slice of each zone and aggregate them. Then, the file system arranges these logs according to the sequence number of the transactions corresponding to the logs and recovers the previous transactions based on the orderly logs.

Figure 6:
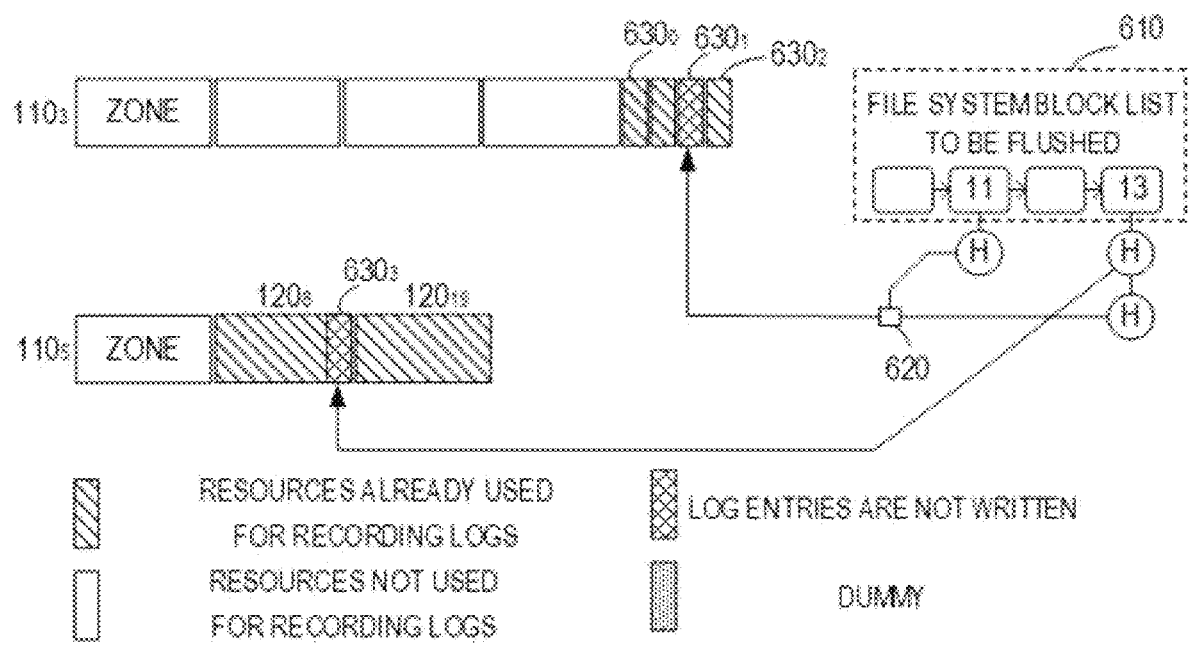
FIG. 6 illustrates a schematic diagram of log flush according to embodiments of the present disclosure.

In the file system, logs recorded in the resource slice can be periodically flushed to the solid-state storage device to release the resource slice associated with the zone for recording a new log. FIG. 6 illustrates a schematic diagram of log flushing according to embodiments of the present invention. For the resource blocks of each resource slice, the resource block at the head and the resource block at the tail are used for spatial management. When a free bitmap space memory is flushed for the resource slice of the log, head will be moved forward. Embodiment described in FIG. 3 explains that the transaction 1895 is used for modifying FSBN 11 and FSBN 13. As shown in FIG. 6, in the file system block list 610 to be flushed, logs that modify FSBN 11 and FSBN 13 will be flushed. The bitmap space memory 620 changes to 2 upon writing the logs of modifications to FSBN 11 and FSBN 13 respectively, and returns to zero after flushing the logs of modifications to FSBN 11 and FSBN 13 to the solid-state storage device.

Figure 7:
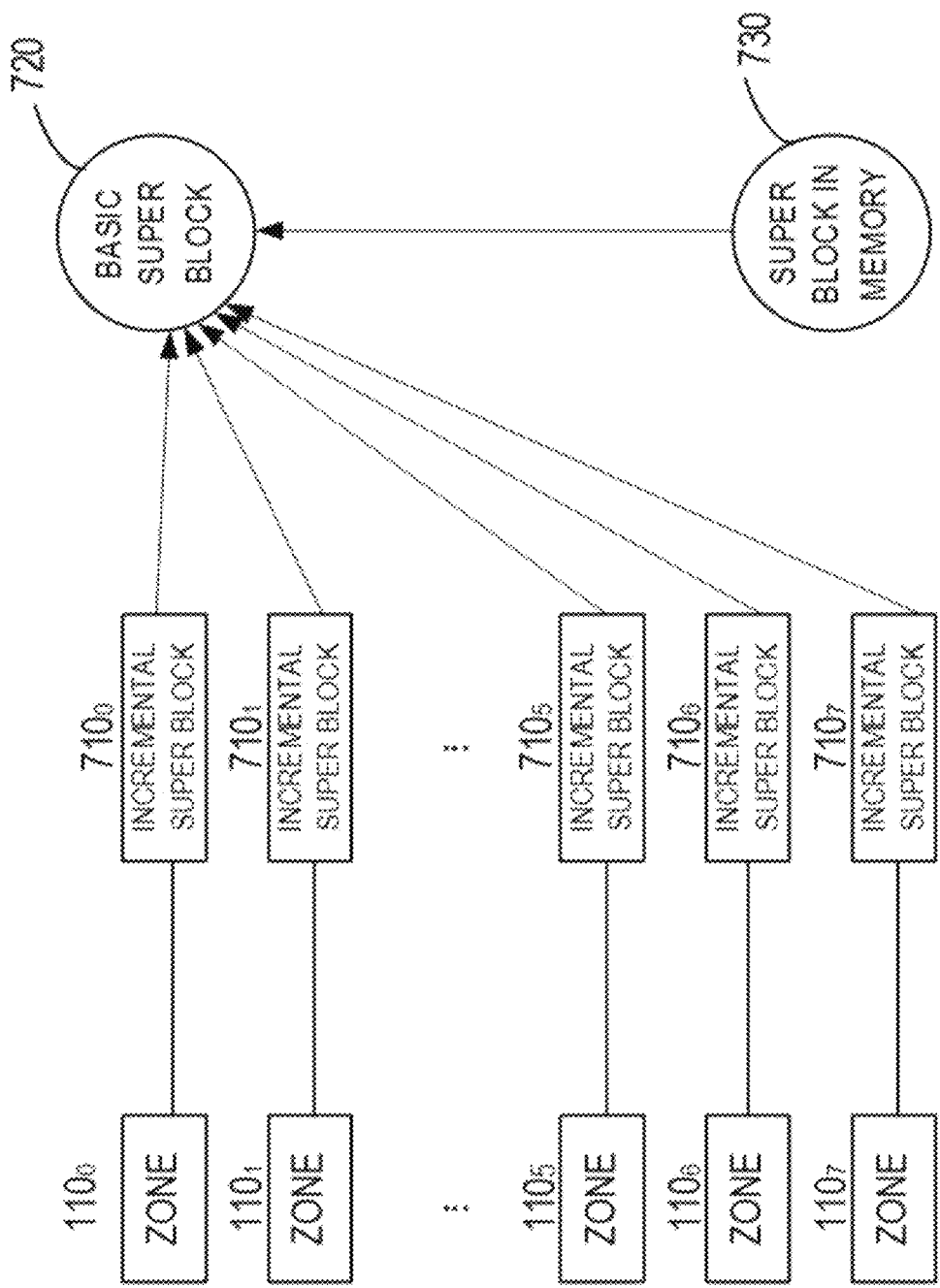
FIG. 7 illustrates a schematic diagram of a super block according to embodiments of the present disclosure.

In the existing file system, most transactions need to modify Super Block (SB) and the serialized modification to the super block usually becomes the bottleneck of the system. Therefore, in some embodiments, it can distribute incremental super block to each zone of the metadata. FIG. 7 illustrates a schematic diagram of a super block according to embodiments of the present disclosure.

As shown in FIG. 7, zones $110_0$ to $110_7$ have their respective incremental super blocks $710_0$ to $710_7$ and these incremental super blocks record usage of corresponding disk zones. When a transaction modifies at least one zone of the zones $110_0$ to $110_7$, e.g., modifies zone $110_5$, the incremental super block of the corresponding zone will be modified. The record of the modifications to the super blocks $710_0$ to $710_7$ can be flushed to a base super block 720 associated with the zones $110_0$ to $110_7$ at a predetermined interval and can be reproduced in the base super block 720 associated with the zones $110_0$ to $110_7$ at a predetermined interval. Moreover, the super block 730 in the memory is also used for recording modifications of the super blocks and super block modification record on the super block 730 of the memory can also be flushed into the base super block 730 at the predetermined time, or reproduced in response to the requirement of the file system.

Figure 8:
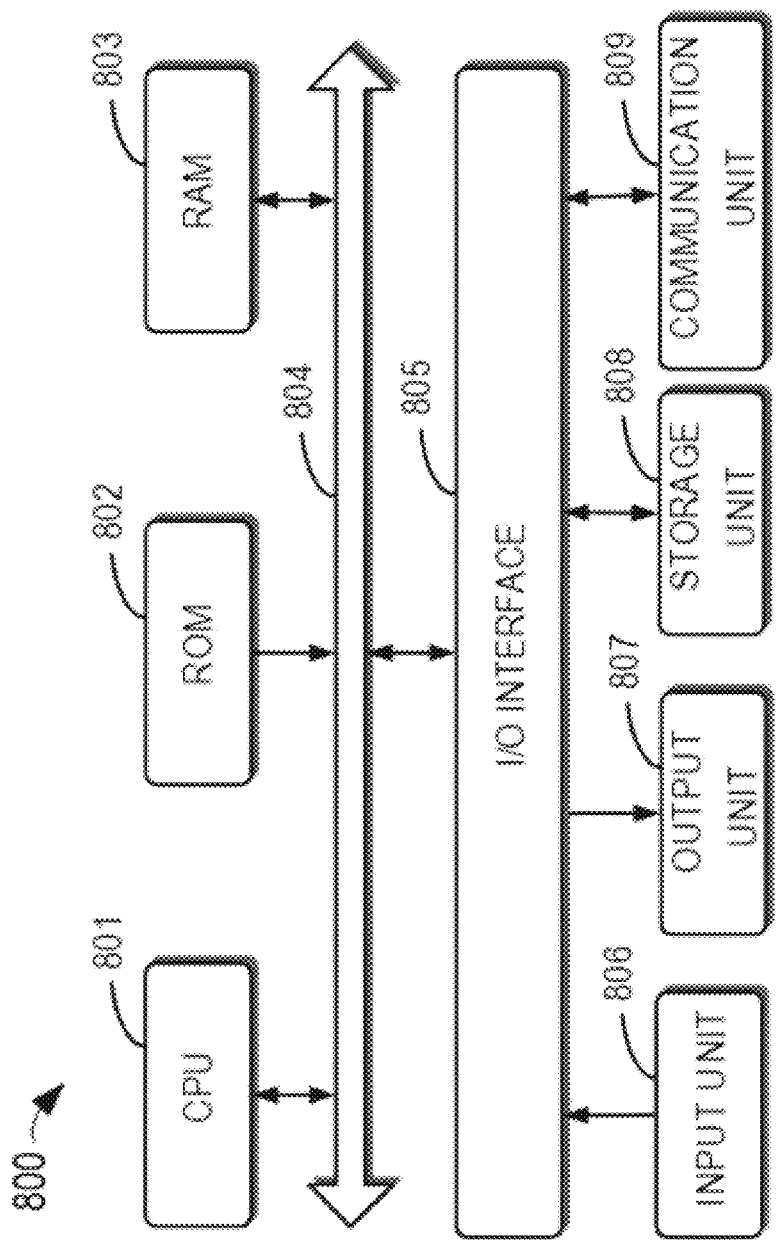
FIG. 8 illustrates a schematic block diagram of a device suitable for implementing embodiments of the present disclosure.

FIG. 8 illustrates a block diagram of a device 800 for implementing embodiments of the present disclosure. As shown in FIG. 8, the device 800 includes a central process unit (CPU) 801, which can execute various suitable actions and processing based on the computer program instructions stored in the read-only memory (ROM) 802 or computer program instructions loaded in the random-access memory (RAM) 803. The RAM 803 can also store all kinds of programs and data required by the operation of the device 800. CPU 801, ROM 802 and RAM 803 are connected to each other via a bus 804. The input/output (I/O) interface 805 is also connected to the bus 804.

A plurality of components in the device 800 is connected to the I/O interface 805, including: an input unit 806, such as keyboard, mouse and the like; an output unit 807, e.g., various kinds of display and loudspeakers etc.; a storage unit 88, such as disk and optical disk etc.; and a communication unit 809, such as network card, modem, wireless transceiver and the like. The communication unit 809 allows the device 800 to exchange information/data with other devices via the computer network, such as Internet, and/or various telecommunication networks.

The above described procedure and processing, such as method 200, can be executed by the processing unit 801. For example, in some embodiments, the method 200 can be implemented as a computer software program tangibly included in the machine program product, e.g., storage unit 808. In some embodiments, the computer program can be partially or fully loaded and/or mounted to the device 800 via ROM 802 and/or communication unit 809. When the computer program is loaded to RAM 803 and executed by the CPU 801, one or more actions of the above described method 200 can be implemented.

In conclusion, embodiments of the present disclosure provide a method for establishing a multi-tier flash cache using hot-spare drives. Compared with the prior art, embodiments of the present disclosure can employ all types of hot-spare drives to establish the secondary cache, so as to more effectively utilize the hot-spare drives. In this way, more cache capacity can be provided for the cache. Furthermore, it can reduce the write I/O request caused by re-promoting the pages flushed to the hard disk to the flash disk, thereby prolonging the service life of the flash disk in the main cache.

The present disclosure can be method, device, system and/or computer program product. The computer program product can include a computer-readable storage medium, on which the computer-readable program instructions for executing various aspects of the present disclosure are loaded.

The computer-readable storage medium can be a tangible device that maintains and stores instructions utilized by the instruction executing devices. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical encoding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can comprise copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages comprise object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described herein with reference to flow chart and/or block diagram of method, apparatus (device) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processor of general-purpose computer, dedicated computer or other programmable data processing apparatuses to manufacture a machine, such that the instructions that, when executed by the processor of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer program product stored with instructions comprises an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable those ordinary skilled in the art to understand embodiments of the present disclosure.

We claim:

1. A computer-implemented method, comprising:
in response to receiving a write request for metadata associated with a first transaction, determining at least a first zone and a second zone associated with the first transaction from a plurality of zones of the metadata, the plurality of zones being formed by striping the metadata;
requesting at least one resource slice for the at least one zone from a resource pool of a logging system; and
recording to the at least one resource slice at least one log indicating that the first transaction modifies the first zone and the second zone, wherein recording to the at least one resource slice the at least one log includes:
in response to determining that there is no buffer queue of logs to be recorded in a first resource slice associated with the first zone and there is a buffer queue of logs to be recorded in a second resource slice associated with the second zone,
recording both a first log associated with the first zone and a second log associated with the second zone to the first resource slice,
generating a first dummy for the second log, wherein the first dummy indicates that the first transaction modified the second zone, exists only in memory, and specifies modifications to the second zone made by the first transaction, and
adding the first dummy into the buffer queue associated with the second resource slice.

2. The method of claim 1, wherein recording to the resource slice the log comprises:
determining a size of the log to be stored; and
in response to the size of the log being smaller than a predetermined threshold, adding the log into a buffer queue associated with the resource slice.

3. The method of claim 2, further comprising:
determining whether a total size of logs to be recorded included in the buffer queue reaches the threshold; and
in response to the total size reaching the threshold, recording the logs to be recorded in the buffer queue to the resource slice.

4. The method of claim 1, wherein the at least one zone at least comprises a first zone and a second zone, and wherein recording to the resource slice the log includes:
receiving a write request for metadata associated with a second transaction, the second transaction having a larger transaction sequence number than the first transaction; and
in response to a buffer queue of logs to be recorded in the first resource slice including the log and a second dummy indicating that the second transaction modified the first zone, and to presence of the first dummy in a buffer queue of logs to be recorded in the second resource slice and a log indicating the second transaction modified the first and second zones, recording to the first resource slice a part of a buffer queue of logs to be recorded in the first resource slice excluding the second dummy.

5. The method of claim 1, further comprising:
releasing the resource slice by flushing the log recorded to the resource slice to a solid-state storage device.

6. The method of claim 1, wherein the at least one zone has an allocated incremental super block, the incremental super block recording usage of a respective disk zone, the method further comprising:

in response to a modification of the at least one zone by
the first transaction, modifying the incremental super
block; and
flushing the incremental super block into a base super
block associated with the plurality of zones at a predetermined time interval.

7. An electronic device, comprising:
at least one processor; and
a memory coupled to the at least one processor and having
instructions stored thereon, the instructions, when
executed by the at least one processor, causing the
device to perform acts comprising:
in response to receiving a write request for metadata
associated with a first transaction, determining at
least a first zone and a second zone associated with
the first transaction from a plurality of zones of the
metadata, the plurality of zones being formed by
striping the metadata;
requesting at least one resource slice for the at least one
zone from a resource pool of a logging system; and
recording to the at least one resource slice at least one
log indicating that the first transaction modifies the
first zone and the second zone, wherein recording to
the at least one resource slice the at least one log
includes:
in response to determining that there is no buffer
queue of logs to be recorded in a first resource
slice associated with the first zone and there is a
buffer queue of logs to be recorded in a second
resource slice associated with the second zone,
recording both a first log associated with the first
zone and a second log associated with the
second zone to the first resource slice,
generating a first dummy for the second log,
wherein the first dummy indicates that the first
transaction modified the second zone, exists
only in memory, and specifies modifications to
the second zone made by the first transaction,
and
adding the first dummy into the buffer queue
associated with the second resource slice.

8. The device of claim 7, wherein recording the log to the
resource slice comprises:
determining a size of the log to be stored; and
in response to the size of the log being smaller than a
predetermined threshold, adding the log into a buffer
queue associated with the resource slice.

9. The device of claim 8, wherein the acts further comprise:
determining whether a total size of logs to be recorded
included in the buffer queue reaches the threshold; and
in response to the total size reaching the threshold,
recording the logs to be recorded in the buffer queue to
the resource slice.

10. The device of claim 7, wherein the at least one zone
at least comprises a first zone and a second zone, and
wherein recording to the resource slice the log includes:
receiving a write request for metadata associated with a
second transaction, the second transaction having a
larger transaction sequence number than the first transaction; and
in response to a buffer queue of logs to be recorded in the
first resource slice including the log and a second
dummy indicating that the second transaction modified
the first zone, and to presence of the first dummy in a
buffer queue of logs to be recorded in the second
resource slice and a log indicating the second transaction modified the first and second zones, recording to
the first resource slice a part of a buffer queue of logs
to be recorded in the first resource slice excluding the
second dummy.

11. The device of claim 7, wherein the acts further
comprise:
releasing the resource slice by flushing the log recorded to
the resource slice to a solid-state storage device.

12. The device of claim 7, wherein the at least one zone
has an allocated incremental super block, the incremental
super block recording usage of a respective disk zone,
wherein the acts further comprise:
in response to a modification of the at least one zone by
the first transaction, modifying the incremental super
block; and
flushing the incremental super block into a base super
block associated with the plurality of zones at a predetermined time interval.

13. A computer program product, comprising:
a non-transitory computer readable medium encoded with
computer-executable code, the code configured for the
execution of:
in response to receiving a write request for metadata
associated with a first transaction, determining at
least a first zone and a second zone associated with
the first transaction from a plurality of zones of the
metadata, the plurality of zones being formed by
striping the metadata;
requesting at least one resource slice for the at least one
zone from a resource pool of a logging system; and
recording to the at least one resource slice at least one
log indicating that the first transaction modifies the
first zone and the second zone, wherein recording to
the at least one resource slice the at least one log
includes:
in response to determining that there is no buffer
queue of logs to be recorded in a first resource
slice associated with the first zone and there is a
buffer queue of logs to be recorded in a second
resource slice associated with the second zone,
recording both a first log associated with the first
zone and a second log associated with the
second zone to the first resource slice,
generating a first dummy for the second log,
wherein the first dummy indicates that the first
transaction modified the second zone, exists
only in memory, and specifies modifications to
the second zone made by the first transaction,
and
adding the first dummy into the buffer queue
associated with the second resource slice.

14. The computer program product of claim 13, wherein
recording the log to the resource slice comprises:
determining a size of the log to be stored; and
in response to the size of the log being smaller than a
predetermined threshold, adding the log into a buffer
queue associated with the resource slice.

15. The method of claim 1, further comprising:
wherein the plurality of zones are formed by striping the
metadata according to file system block number; and
wherein determining the first zone and the second zone
associated with the first transaction includes determining that the first transaction modifies both at least one
file system block number in the first zone and at least
one file system block number in the second zone.

* * * * *